US007413068B2

(12) United States Patent
Mustalahti et al.

(10) Patent No.: US 7,413,068 B2
(45) Date of Patent: Aug. 19, 2008

(54) TRAVELATOR, MOVING RAMP OR ESCALATOR

(75) Inventors: Jorma Mustalahti, Hyvinkää (FI); Esko Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 0 days.

(21) Appl. No.: 11/826,391

(22) Filed: Jul. 13, 2007

(65) Prior Publication Data

US 2008/0011580 A1 Jan. 17, 2008

Related U.S. Application Data

(63) Continuation of application No. PCT/FI2006/000014, filed on Jan. 11, 2006.

(30) Foreign Application Priority Data

Jan. 14, 2005 (FI) ................................. 20050047

(51) Int. Cl.
*B65G 17/00* (2006.01)

(52) U.S. Cl. ...................................... 198/337; 198/335

(58) Field of Classification Search ................. 198/321, 198/326, 334, 335, 337, 338
See application file for complete search history.

(56) References Cited

U.S. PATENT DOCUMENTS

| | | | | |
|---|---|---|---|---|
| 2,578,566 | A * | 12/1951 | Masek et al. | 198/337 |
| 5,044,485 | A * | 9/1991 | Loder | 198/325 |
| 5,156,252 | A * | 10/1992 | Mello et al. | 198/338 |
| 5,538,124 | A * | 7/1996 | Loder | 198/324 |
| 6,006,889 | A * | 12/1999 | Caron | 198/335 |
| 2006/0207857 | A1* | 9/2006 | Mustalahti et al. | 198/334 |

FOREIGN PATENT DOCUMENTS

| | | |
|---|---|---|
| JP | 2000-318961 A | 11/2000 |
| JP | 2001-106463 A | 4/2001 |
| JP | 2004-203560 A | 7/2004 |

* cited by examiner

*Primary Examiner*—James R Bidwell
(74) *Attorney, Agent, or Firm*—Birch, Stewart, Kolasch & Birch, LLP

(57) ABSTRACT

A first handrail (2) of the travelator, moving ramp or escalator comprises an endless moving first handrail belt (3) formed as a loop and having a first handhold portion (4) that the passenger can grasp with a hand for support. The first handhold portion (4) has a posterior end (5) posterior in the conveying direction. To support and guide the handrail belt (3), the handrail (2) comprises a first handrail frame (6) having a first side (7). A second handrail (8) is placed after the first handrail in the conveying direction and alongside the conveyor on the same side with the first handrail and extending in a direction parallel to the first handrail (2). The second handrail (8) comprises a second moving endless handrail belt (9) formed as a loop and having an upper second handhold portion (10) that the passenger can grasp with a hand for support. The second handhold portion (10) has an anterior end (11) anterior in the conveying direction. To support and guide the handrail belt (9), the handrail (8) comprises a second handrail frame (12) having a second side (13), which is the side facing the aforesaid first side (7). The first handrail (2) and the second handrail (8) are mounted with a mutual overlap such that the posterior end (5) of the first handhold portion (4) is located substantially side by side with the anterior end (11) of the second handhold portion (10) so that a gap (14) remains between the first and second handhold portions. The first handrail (2) and/or the second handrail (8) comprise/comprises a guide element (15) to prevent the passenger's fingers from getting into the gap (14).

14 Claims, 4 Drawing Sheets

TRAVELATOR, MOVING RAMP OR ESCALATOR

Figure 1:
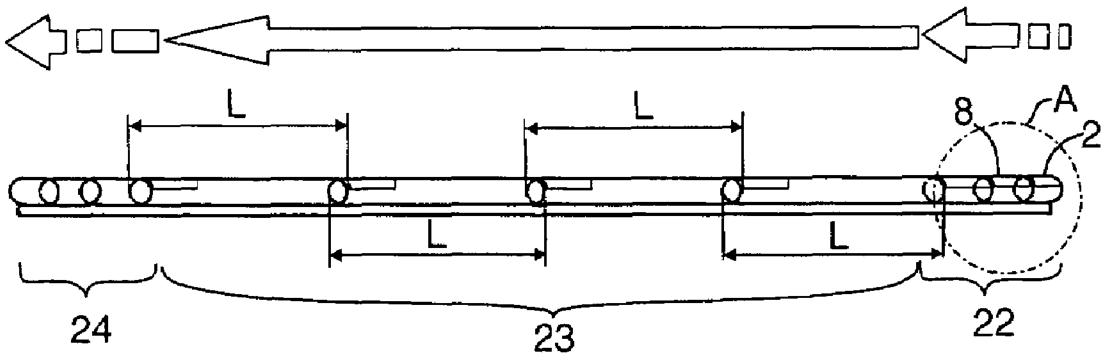

This application is a Continuation of copending PCT International Application No. PCT/FI2006/000014 filed on Jan. 11, 2006, which designated the United States, and on which priority is claimed under 35 U.S.C. § 120. This application also claims priority under 35 U.S.C. § 119(a) on Patent Application No(s). 20050047 filed in Finland on Jan. 14, 2005. The entire contents of each of the above documents is hereby incorporated by reference.

1. Field of the Invention

The present invention relates to a travelator, moving ramp or escalator as defined in the preamble of claim 1.

2. Background of the Invention

There are various prior-art travelator, moving ramp or escalator solutions intended for conveying people standing or walking. Travelators are also known as moving sidewalks and autowalks. Such travelators are installed e.g. in the long corridors of airports, shopping centers and subway stations and in large spaces. Travelators may comprise horizontal portions and gently sloping ascending and/or descending portions.

In prior art, a travelator, moving ramp or escalator is known which comprises a conveyor for moving a passenger on the conveyor in the conveying direction. The travelator further comprises a first handrail and a second handrail, which is located after the first handrail in the conveying direction, extending in a direction parallel with it alongside and on the same side of the conveyor. The first handrail comprises a first moving endless handrail belt formed as a loop, which has an upper first handhold portion that the passenger can grasp with a hand for support. The handrail belt is supported on a first handrail frame. Similarly, the second handrail comprises a second moving endless handrail belt formed as a loop, which has an upper second handhold portion that the passenger can grasp with a hand for support. The handrail belt is supported on a second handrail frame.

A solution of this type is disclosed in specification JP 2000-318961, which concerns a handrail for an acceleration/deceleration-type travelator having several handrails one after the other. In each two axially successive handrails, the turn-around portions of the endless handrail belts moving independently of each other are located very close to each other, which is why the handrail belts have to form an arc of very small radius in the turn-around portions. To cover the gap between two successive handrail belts, the handrail is provided with a fixed handrail part in the form of a comb plate, arranged in alignment with the handrail belts. The comb plate has a number of mutually adjacent fingers. The endless handrail belts are correspondingly provided with a plurality of mutually adjacent grooves fitted to receive the comb plate fingers. The function of the comb plate and grooves is to prevent injuries to the passenger's hand/fingers by preventing them from getting into the gap between the handrail belts.

A problem with the prior-art solution is that it does not permit the use of conventional large-diameter end turn-around parts where the handrail belt turns around a large 180° arc between the lower return portion and the upper handhold portion.

A further problem with the prior-art solution is that the comb plate and the grooved handrail belt are expensive and complicated special structures. It is inconvenient for the passenger to touch and lean on the grooved handrail belt. The grooves also tend to gather impurities.

OBJECT OF THE INVENTION

The object of the invention is to overcome the drawbacks mentioned above.

A specific object of the invention is to disclose a safe travelator, moving ramp or escalator wherein hands and fingers are prevented from getting between successive handrail belts in a simple and economically advantageous manner.

A further object of the invention is to disclose a travelator, moving ramp or escalator wherein the handrail can be implemented using a conventional smooth-surfaced handrail belt to form an endless handrail belt and wherein the ends can be implemented using conventional turn-around portions forming a circular arc of a large radius (e.g. a radius of the order of 0.5 m).

BRIEF DESCRIPTION OF THE INVENTION

The travelator, moving ramp or escalator of the invention is characterized by what is disclosed in claim 1. Other embodiments of the invention are characterized by what is disclosed in the other claims. Inventive embodiments are also presented in the description part and drawings of the present application. The inventive content disclosed in the application can also be defined in other ways than is done in the claims below. The inventive content may also consist of several separate inventions, especially if the invention is considered in the light of explicit or implicit sub-tasks or in respect of advantages or sets of advantages achieved. In this case, some of the attributes contained in the claims below may be superfluous from the point of view of separate inventive concepts. Within the framework of the basic concept of the invention, features of different embodiments of the invention can be applied in connection with other embodiments.

The travelator, moving ramp or escalator of the invention comprises a conveyor for moving a passenger on the conveyor in the conveying direction;

a first handrail comprising a moving first handrail belt formed as a loop, which has an upper first handhold portion that the passenger can grasp with a hand for support, said first handhold portion having a posterior end posterior in the conveying direction; and a first handrail frame for supporting and guiding the handrail belt, and a first side, and a second handrail, which, as seen in the conveying direction, is placed after the first handrail and alongside the conveyor on the same side with the first handrail and extending in a direction parallel with it, said second handrail comprising a second moving endless handrail belt formed as a loop having an upper second handhold portion that the passenger can grasp with a hand for support, and which second handhold portion has an anterior end anterior in the conveying direction; and a second handrail frame for supporting and guiding the handrail belt, and a second side, which is the side facing the first side of the first handrail frame.

According to the invention, the first handrail and the second handrail are mounted with a mutual overlap such that the posterior end of the first handhold portion is located substantially side by side with the anterior end of the second handhold portion, leaving a gap between the first handhold portion and the second handhold portion. The first handrail and/or the second handrail comprise/comprises a guide element to prevent the passenger's fingers from getting into the gap between the mutually adjacent handrail belts.

The invention has the advantage that the overlapped arrangement of the handrails allows the handrail ends to be implemented using conventional arched turn-around portions of large radius. The guide element keeps passengers' fingers away from the gap remaining between the handrail belts and eliminates the risks of getting caught or wedged. The solution is safe, simple and cheap. The guide element can be so formed that it comprises no moving parts subject to wear. In long travelators, it is possible to use handrails of desired length, a suitable number of which are arranged in an overlapping manner one after the other.

In an embodiment of the travelator, moving ramp or escalator, the first handrail is in a more inward position relative to the conveyor than the second handrail. The guide element is attached to the first side of the first handrail frame.

In an embodiment of the travelator, moving ramp or escalator, the guide element comprises a guide edge extending immediately below the first handrail belt, near the first handhold portion and parallel to it, to prevent fingers from being inserted under the first handrail belt.

In an embodiment of the travelator, moving ramp or escalator, the guide edge is provided with warning elements, such as protuberances, corrugated shapes or the like, formed in it so that the fingers of a hand grasping the first handrail belt can meet the warning elements to warn the passenger so as to make him/her aware of the approaching change-over point, where the hand has to be moved from first handrail belt onto the second handrail belt.

In an embodiment of the travelator, moving ramp or escalator, the second handrail belt comprises a lower return portion and an arched turn-around portion, where the second handrail belt bends over with a substantially large radius 180° from the return portion into the second handhold portion. The guide element comprises a cover strip extending in lateral and vertical directions at least partially over the turn-around portion of the second handrail belt, following its curved shape, to prevent the passenger's hand from getting into the gap between the first handrail frame and the turn-around portion of the second handrail belt.

In an embodiment of the travelator, moving ramp or escalator, the guide element comprises an insert element extending longitudinally and vertically in the gap, partially filling the gap in the lengthwise and widthwise directions near the level of the upper surface of the handrail belts so as to prevent fingers from being inserted into the gap.

In an embodiment of the travelator, moving ramp or escalator, the guide element is a formed piece of one solid material, with the guide edge, warning elements, cover strip and insert element integrated in it.

In an embodiment of the travelator, moving ramp or escalator, the velocities of motion of the first handrail belt and the second handrail belt are substantially the same.

In an embodiment of the travelator, moving ramp or escalator, the velocities of motion of the first handrail belt and the second handrail belt are different.

In an embodiment of the travelator, moving ramp or escalator, the travelator, moving ramp or escalator is a so-called high-speed travelator, moving ramp or escalator, which comprises an acceleration section for accelerating the passenger transport speed from a substantially slow initial speed to a heightened transport speed; a constant-speed section for conveying the passenger at a constant transport speed, and a deceleration section for decelerating the passenger transport speed from the constant transport speed to a decelerated final speed.

In an embodiment of the travelator, moving ramp or escalator, the first handrail is in the acceleration section and the second handrail is in the acceleration section or in the constant-speed section, in which case the velocity of motion of the second handrail belt is higher than the velocity of motion of the first handrail belt.

In an embodiment of the travelator, moving ramp or escalator, the first handrail and the second handrail are in the constant-speed section, the velocities of motion of the first handrail belt and second handrail belt thus being substantially the same.

In an embodiment of the travelator, moving ramp or escalator, the first handrail is in the constant-speed section or in the deceleration section and the second handrail is in the deceleration section, the velocity of motion of the second handrail belt being thus lower than the velocity of motion of the first handrail belt.

In an embodiment of the travelator, moving ramp or escalator, the travelator, moving ramp or escalator is a low-construction travelator, moving ramp or escalator designed to be mounted on a fixed base, such as a floor or other support.

LIST OF FIGURES

Figure 2:
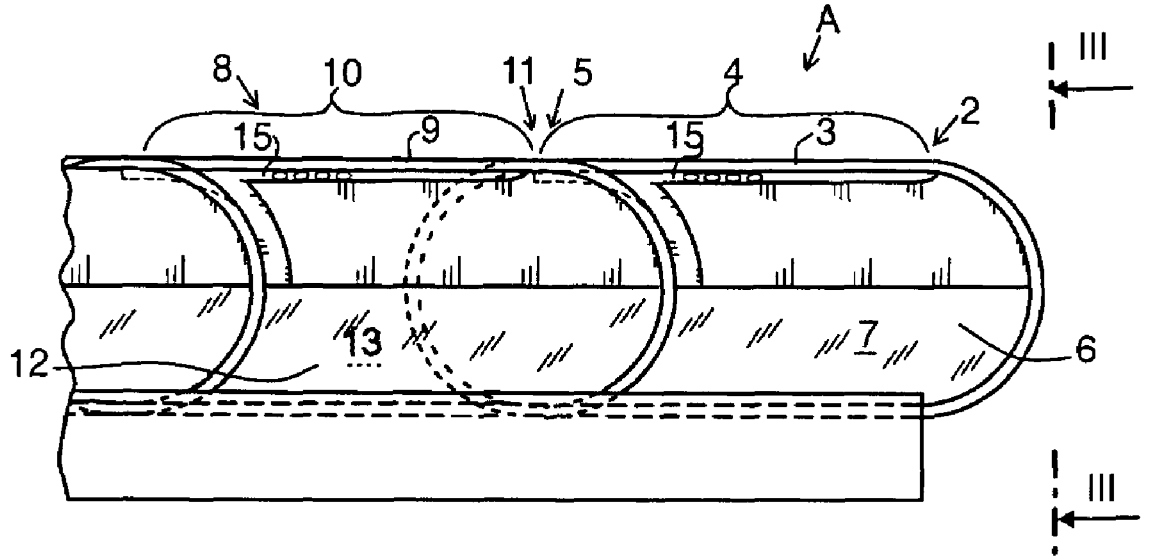
Figure 3:
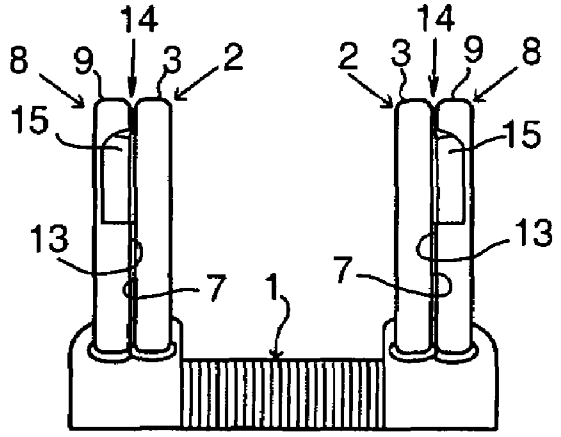
Figure 4:
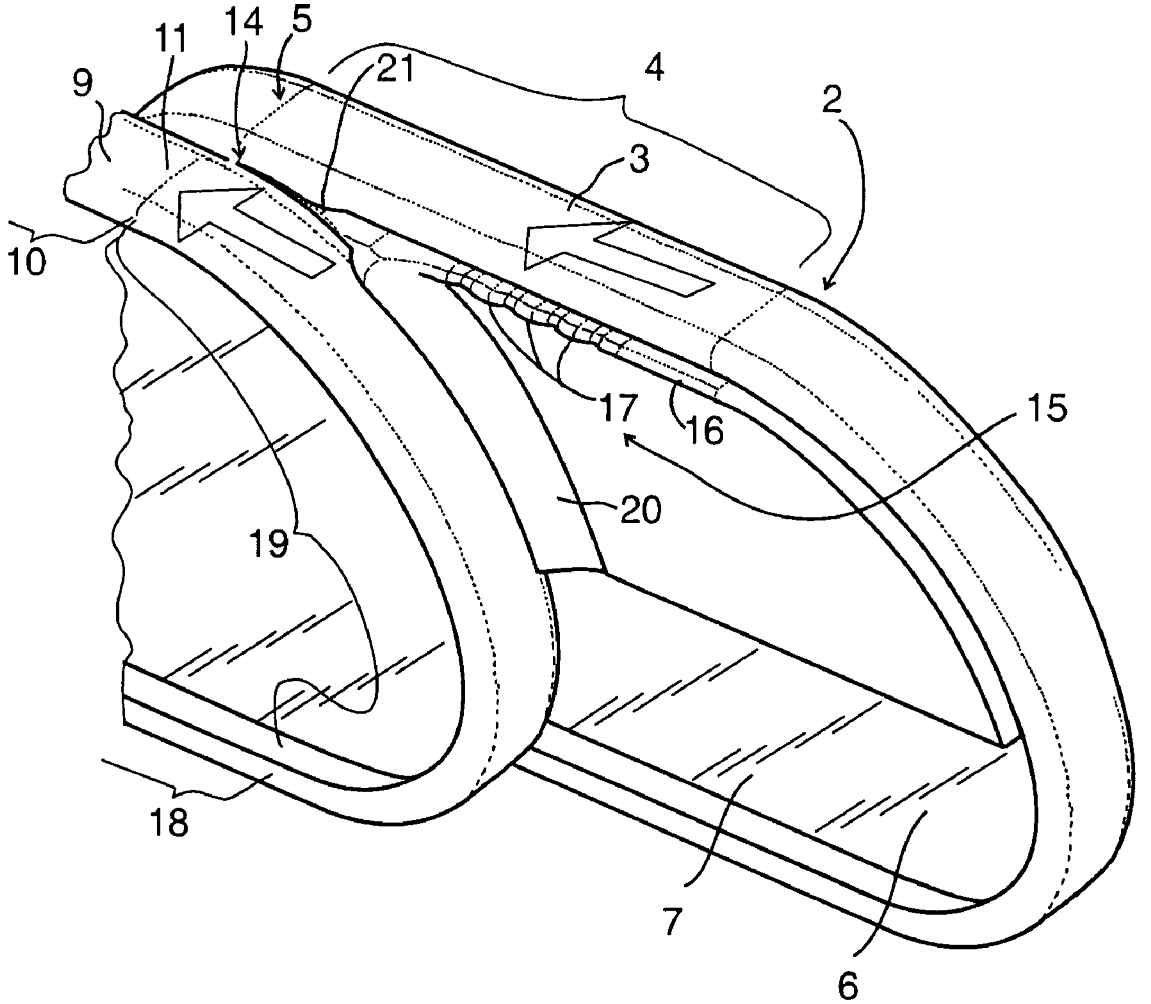
Figure 5:
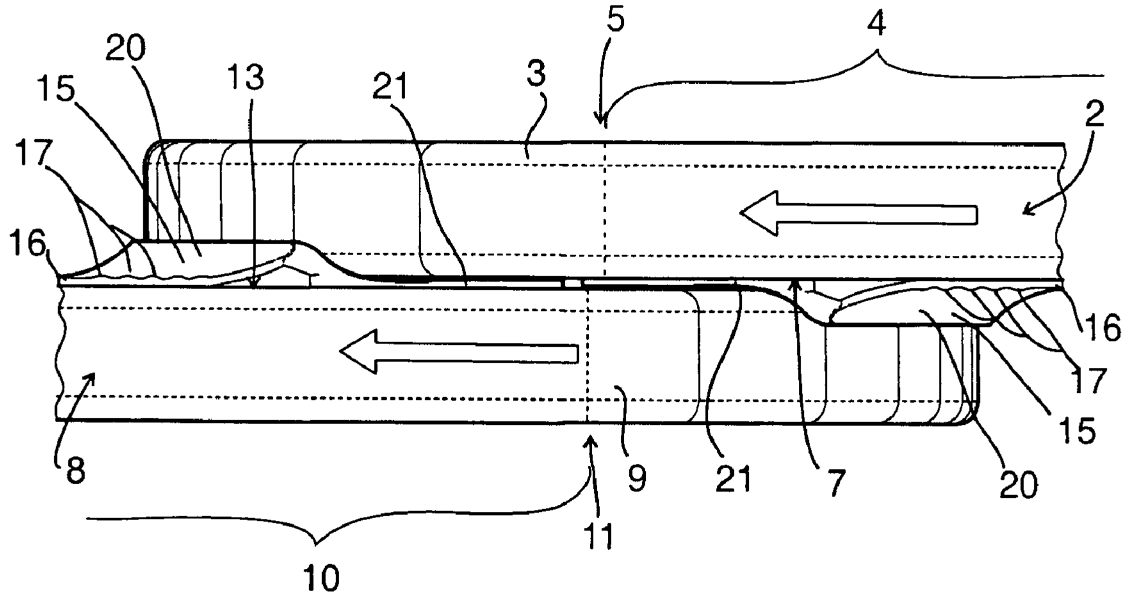
Figure 6:
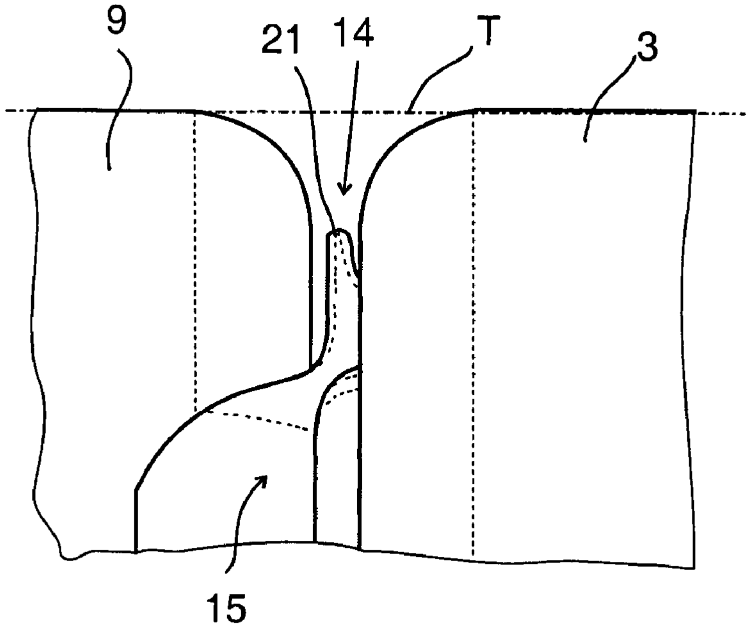
Figure 7:
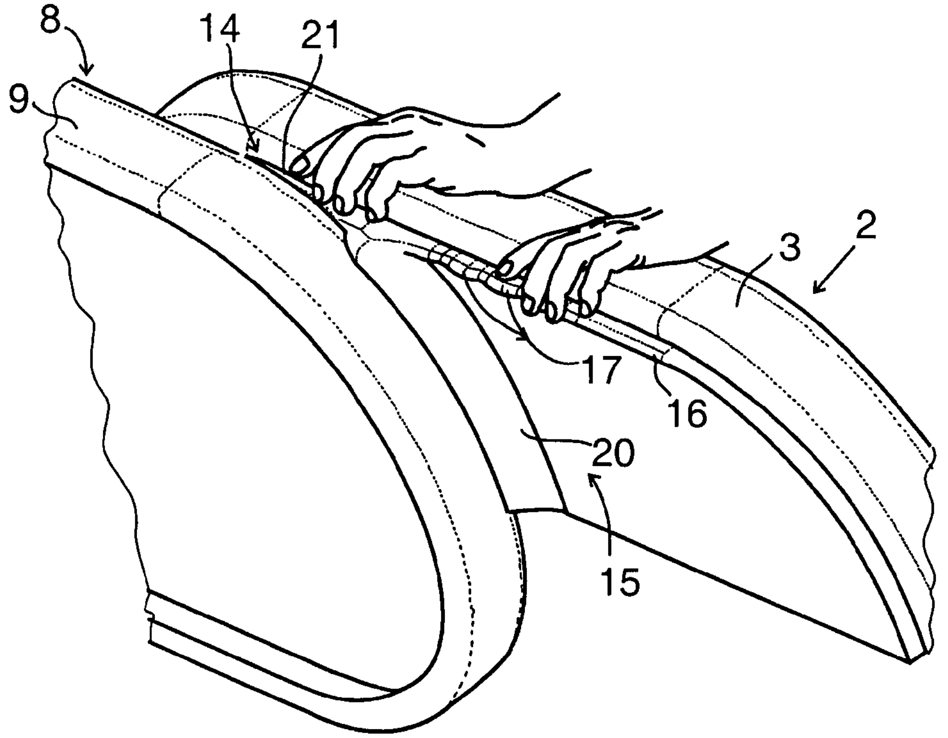
Figure 8:
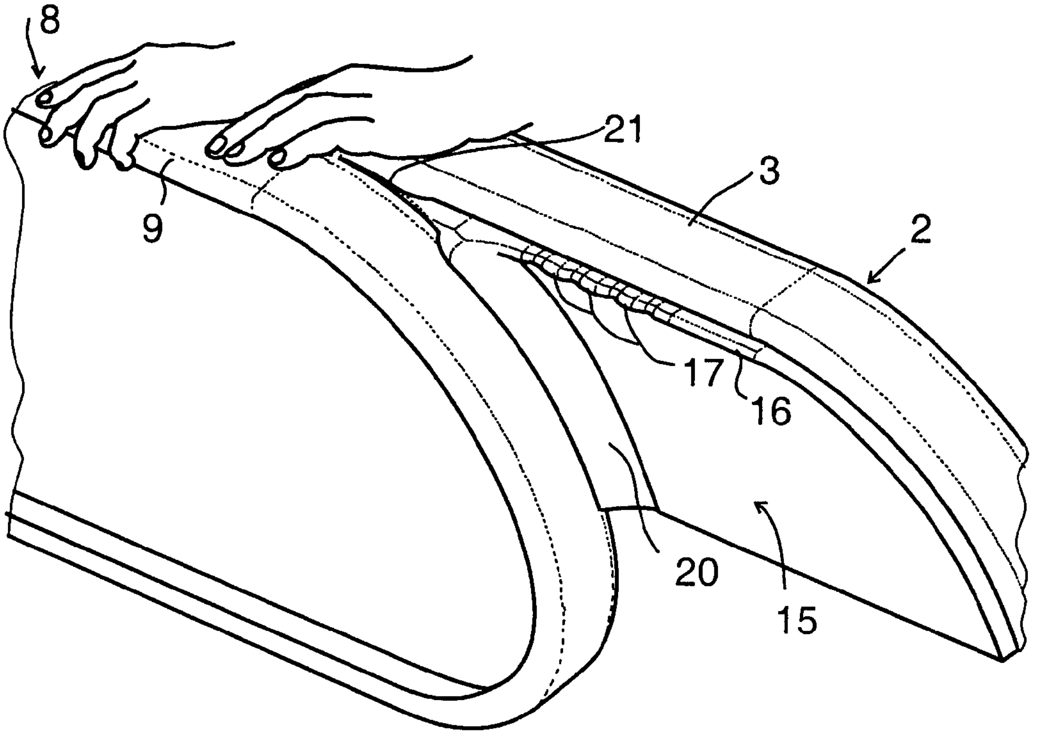

In the following, the invention will be described in detail with reference to a few embodiment examples and the attached drawing, wherein FIG. 1 presents diagrammatic side view of an embodiment of the travelator of the invention, FIG. 2 presents a magnified view of part A of FIG. 1, FIG. 3 presents a view III-III of FIG. 2, FIG. 4 presents an axonometric view, seen obliquely from above, of the overlapping portion of the overlapped first and second handrails, with a guide element mounted in it, FIG. 5 presents a top view of the overlapping portion of the first and second handrail, FIG. 6 presents the change-over portion of FIG. 4 as seen from direction VI-VI in FIG. 5, and FIGS. 7 and 8 present diagrams illustrating how the passenger's hand is guided over the change-over portion.

DETAILED DESCRIPTION OF THE INVENTION

FIG. 1 presents a diagrammatic representation of a horizontal travelator. The travelator comprises a conveyor 1 and successive handrails 2, 8 placed alongside it. In FIG. 1 and in the following specification, two successive handrails 2, 8 located at the entry end of the travelator are described, but it is obvious that the principles of the invention can be applied to the change-over portions of successive handrails at any point along the travelator.

The travelator presented in FIG. 1 is a so-called high-speed travelator, whose conveying direction is from right to left. The travelator is a low-construction travelator designed to be mounted on a fixed base, such as a floor or other support. At the entry end, the travelator has an acceleration section 22 for accelerating the passenger transport speed from a substantially slow initial speed, corresponding to human walking speed (e.g. 0.5-0.7 m/s), to a heightened transport speed (e.g. 5 m/s). In the constant-speed section 23, the passenger is conveyed at this constant transport speed. At the exit end, the travelator has a deceleration section 24, which slows down the passenger transport speed from the constant transport speed to a decelerated final speed, which corresponds to the aforesaid human walking speed. The handrail belts on the handrails alongside the travelator move at a speed close to the speed of the conveyor in the corresponding section so that the lead/slip of the handrail belt over the length L of the handrail in relation to the conveyor is within suitable limits, e.g. +/−35-40 cm.

FIG. 2 shows section A in FIG. 1 at the entry end of the travelator, which comprises a first handrail 2 and a second handrail 8 placed one after the other. The second handrail 8 is located after the first handrail 2 in the conveying direction on the same side with it, extending in a direction parallel to it alongside the conveyor 1, separated by a short lateral distance from it so that the handrails 2 and 8 are placed side by side in an overlapping manner.

The first handrail 2 comprises an endless moving first handrail belt 3 formed as a loop and comprising an upper first handhold portion 4, which the passenger can grasp with a hand for support, said first handhold portion having a posterior end 5 posterior in the conveying direction. The return portion of the handrail belt 3 is guided to run inside the conveyor frame. At either end of the handrail belt loop is an arched turn-around portion of large radius between the return portion and the first handhold portion 3. The handrail belt 3 is supported and guided by a first handrail frame 6, which has a first side 7, which in FIG. 2 is the side facing towards the observer.

Correspondingly, the second handrail 8 is of identical construction with the first handrail 2. The second handrail 8 comprises an endless moving second handrail belt 9 formed as a loop and comprising an upper second handhold portion 10, which the passenger can grasp with a hand for support, said second handhold portion having an anterior end 11 anterior in the conveying direction. The second handrail frame 12 supports and guides the handrail belt 9. The second side 13 of the second handrail frame 12 is the side facing towards the first side 7 of the first handrail frame 6 and in FIG. 2 facing away from the observer.

As can be seen from FIG. 2-8, the first handrail 2 and the second handrail 8 are arranged in an overlapping manner such that the posterior end 5 of the first handhold portion 4 lies substantially side by side with the anterior end 11 of the second handhold portion 10 so that a gap 14 remains between the first and second handhold portions. As shown in FIG. 2, a guide element 15 is attached to the first handrail 2 to prevent the passenger's fingers from getting into the gap 14. The first handrail 2 is in a more inward position relative to the conveyor 1 than the second handrail 8.

Referring to FIG. 5, it shows a guide element 15 which is placed on the entry side of the overlapping portion as seen in the direction of motion of the handrail belt and which is attached to the first side 7 of the first handrail frame 6. Arranged on the trailing side of the overlapping portion as seen in the direction of motion of the handrail belt is a second guide element 15, which is attached to the second side 13 of the second handrail frame 12.

As can be best seen from FIG. 4 and 7-8, the guide element 15 comprises a guide edge 16 extending immediately below the first handrail belt 3 near the first handhold portion 4 and parallel to it, preventing fingers from being inserted under the first handrail belt 3 (see FIG. 7). The guide edge 16 is provided with warning elements 17, which in this example are corrugated shapes or the like, such that the fingers of a hand grasping the first handrail belt 3 can meet the warning elements 17 to make the passenger aware of the approaching change-over point at which the hand has to be moved from the first handrail belt 3 onto the second handrail belt 8. FIG. 7 shows how the fingers of a hand grasping the first handrail belt 3 meet the warning elements 17.

As can also be seen from FIGS. 5, 6 and 7, the guide element 15 additionally comprises an insert element 21 extending longitudinally and vertically in the gap 14, partially filling the gap in the lengthwise and widthwise directions near the level T of the upper surface of the handrail belts 3, 9 so as to prevent fingers from being inserted into the gap 14. The insert element 21 prevents fingers from being wedged between the adjacent belts and is so shaped that it simultaneously raises the fingers onto the next handrail belt. One cannot insert one's fingers between the belts even if one should try to do so, and the fingers and hand are safely guided onto the next handrail belt.

The guide element 15 also comprises a cover strip 20, which extends in lateral and vertical directions at least partially over the turn-around portion 19 of the second handrail belt 3, following its curved shape, to prevent the passenger's hand from getting into the gap between the first handrail frame 6 and the turn-around portion 19 of the second handrail belt 3.

The guide element 15 is a formed piece of one solid material, with the guide edge 16, warning elements 17, cover strip 20 and insert element 21 formed in it.

Again referring to FIG. 1, the first handrail 2 is in the acceleration section 22 and the second handrail 8 is in the acceleration section 22 or in the constant-speed section 23, in which case the velocity of motion of the second handrail belt 9 is higher than the velocity of motion of the first handrail belt 3.

The first handrail 2 and the second handrail 8 may also be in the constant-speed section 23, in which case the velocities of motion of the first handrail belt 3 and the second handrail belt 9 are substantially the same.

Correspondingly, the first handrail 2 may be in the constant-speed section 23 or deceleration section 24 and the second handrail 8 in the deceleration section 24, in which case the velocity of motion of the second handrail belt 9 is lower than the velocity of motion of the first handrail belt 3.

Arranging the successive handrails in an overlapping manner as described above allows the handrails of the travelator to be divided into sections of suitable length, thus obviating the need for very long handrail belt loops. The length of the handrail belt loop is freely selectable.

The invention is not limited to the embodiment examples described above; instead, many variations are possible within the scope of the inventive concept defined in the claims. Thus, the travelator in the above-described embodiment example may be replaced by a moving ramp, an escalator or a similar conveyor.

It is obvious to the person skilled in the art that the invention is not limited to the embodiment examples described above, in which the invention has been described by way of example, but that many variations and different embodiments of the invention are possible within the scope of the inventive concept defined in the claims presented below.

LIST OF REFERENCE NUMBERS conveyor (1)
first handrail (2)
first handrail belt (3)
first handhold portion (4)
posterior end (5)
first handrail frame (6)
first side (7)
second handrail (8)
second handrail belt (9)
second handhold portion (10)
anterior end (11)
second handrail frame (12)

second side (13)
gap (14)
guide element (15)
guide edge (16)
warning elements (17)
return portion (18)
turn-around portion (19)
cover strip (20)
insert element (21)
level (T)
acceleration section (22)
constant-speed section (23)
deceleration section (24)

The invention claimed is:

1. A travelator, moving ramp or escalator for conveying people, which comprises a conveyor (1) for moving a passenger on the conveyor in the conveying direction;

a first handrail (2), comprising a moving first handrail belt (3) formed as a loop, which has an upper first handhold portion (4) that the passenger can grasp with a hand for support, said first handhold portion having a posterior end (5) posterior in the conveying direction; and a first handrail frame (6) for supporting and guiding the handrail belt (3), and a first side (7), and a second handrail (8), which, as seen in the conveying direction, is disposed after the first handrail and alongside the conveyor on the same side with the first handrail (2) and extending in a direction parallel with it, said second handrail (8) comprising a second moving endless handrail belt (9) formed as a loop and having an upper second handhold portion (10) that the passenger can grasp with a hand for support, and which second handhold portion has an anterior end (11) anterior in the conveying direction; and a second handrail frame (12) for supporting and guiding the handrail belt (9), and a second side (13), which is the side facing the first side (7) of the first handrail frame (6), characterized in that the first handrail (2) and the second handrail (8) are mounted with a mutual overlap such that the posterior end (5) of the first handhold portion (4) is located substantially side by side with the anterior end (11) of the second handhold portion (10) so that a gap (14) remains between the first handhold portion and the second handhold portion; and that the first handrail (2) and/or the second handrail (8) comprise/comprises a guide element (15) to prevent the passenger's fingers from getting into the gap (14).

2. A travelator, moving ramp or escalator according to claim 1, characterized in that the first handrail (2) is located in a more inward position relative to the conveyor than the second handrail (8); and that the guide element (15) is attached to the first side (7) of the first handrail frame (6).

3. A travelator, moving ramp or escalator according to claim 1 characterized in that the guide element (15) comprises a guide edge (16) extending immediately below the first handrail belt (3), near the first handhold portion (4) and parallel to it, to prevent fingers from being inserted under the first handrail belt (3).

4. A travelator, moving ramp or escalator according to claim 3, characterized in that the guide edge (16) has warning elements (17), such as protuberances, corrugated shapes or the like, formed in it so that the fingers of a hand grasping the first handrail belt (3) can meet the warning elements (17) to warn the passenger so as to make him/her aware of the approaching change-over point, where the hand has to be moved from first handrail belt (3) onto the second handrail belt (8).

5. A travelator, moving ramp or escalator according to claim 1, characterized in that the second handrail belt (3) comprises a lower return portion (18) and an arched turn-around portion (19), where the second handrail belt turns around with a substantially large radius 180° from the return portion (18) into the second handhold portion (10); and that the guide element (15) comprises a cover strip (20) extending in lateral and vertical directions at least partially over the turn-around portion of the second handrail belt, following its curved shape, to prevent the passenger's hand from getting into the gap between the first handrail frame (6) and the turn-around portion (19) of the second handrail belt (3).

6. A travelator, moving ramp or escalator according to claim 1, characterized in that the guide element (15) comprises an insert element (21) extending longitudinally and vertically in the gap (14), partially filling the gap in the lengthwise and widthwise directions near the level (T) of the upper surface of the handrail belts (3, 9), preventing fingers from being inserted into the gap.

7. A travelator, moving ramp or escalator according to claim 6, characterized in that the guide element (15) is a formed piece of one solid material, with the guide edge (16), warning elements (17), cover strip (20) and insert element (21) integrated in it.

8. A travelator, moving ramp or escalator according to claim 1, characterized in that the velocities of motion of the first handrail belt (3) and the second handrail belt (9) are substantially the same.

9. A travelator, moving ramp or escalator according to claim 1, characterized in that the velocities of motion of the first handrail belt (3) and the second handrail belt (9) are different.

10. A travelator, moving ramp or escalator according to claim 1, characterized in that the travelator, moving ramp or escalator is a so-called high-speed travelator, moving ramp or escalator, which comprises an acceleration section (22) for accelerating the passenger transport speed from a substantially slow initial speed to a heightened transport speed; a constant-speed section (23) for conveying the passenger at a constant transport speed; and a deceleration section (24) for decelerating the passenger transport speed from the constant transport speed to a decelerated final speed.

11. A travelator, moving ramp or escalator according to claim 10, characterized in that the first handrail (2) is in the acceleration section (22) and the second handrail (8) is in the acceleration section (22) or in the constant-speed section (23), in which case the velocity of motion of the second handrail belt (9) is higher than the velocity of motion of the first handrail belt (3).

12. A travelator, moving ramp or escalator according to claim 1, characterized in that the first handrail (2) and the second handrail (8) are in the constant-speed section (23), the velocities of motion of the first handrail belt (3) and second handrail belt (9) thus being substantially the same.

13. A travelator, moving ramp or escalator according to claim 1, characterized in that the first handrail (2) is in the constant-speed section (23) or in the deceleration section (24) and the second handrail (8) is in the deceleration section (24), in which case the velocity of motion of the second handrail belt (9) is lower than the velocity of motion of the first handrail belt (3).

14. A travelator, moving ramp or escalator according to claim 1, characterized in that the travelator, moving ramp or escalator is a low-construction travelator, moving ramp or escalator designed to be mounted on a fixed base, such as a floor or other support.

* * * * *